United States Patent Office 3,487,943
Patented Jan. 6, 1970

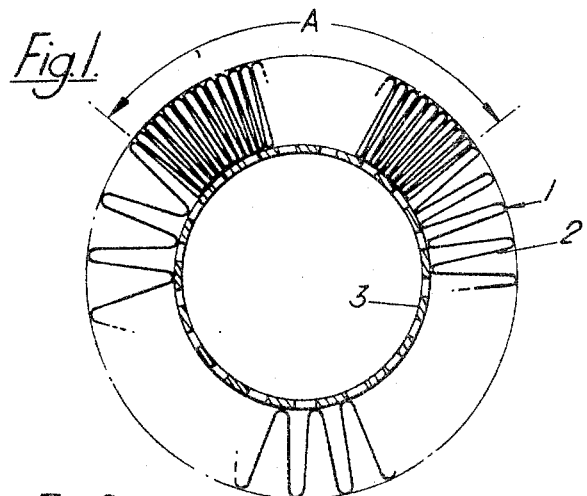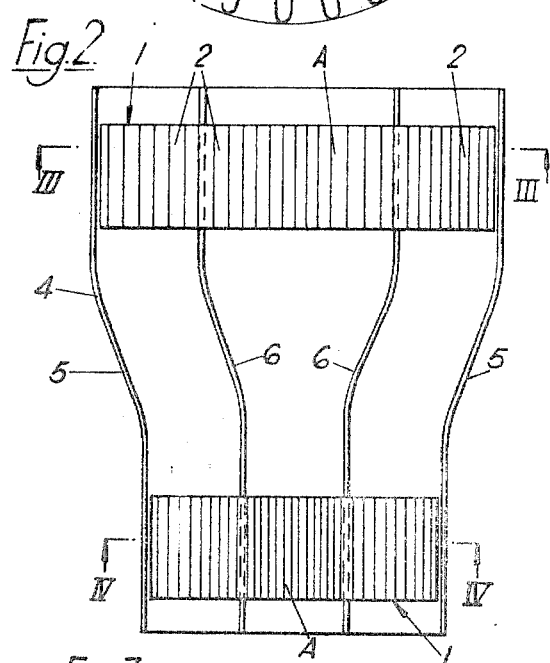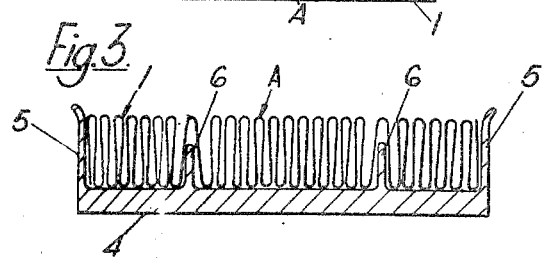

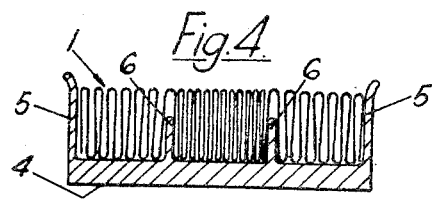
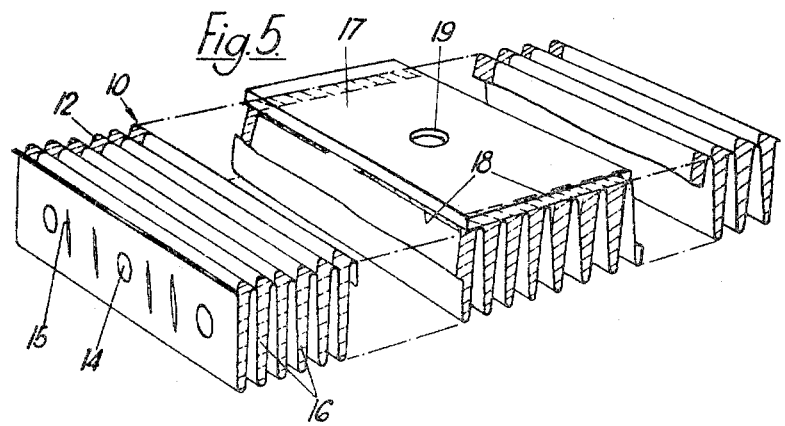
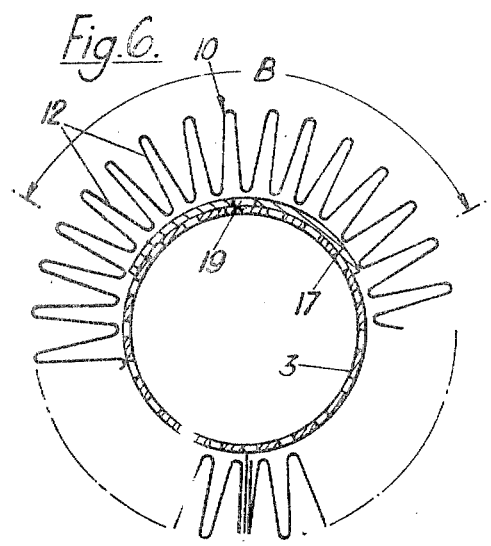
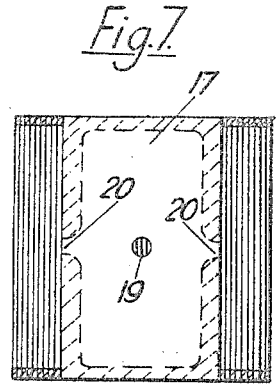

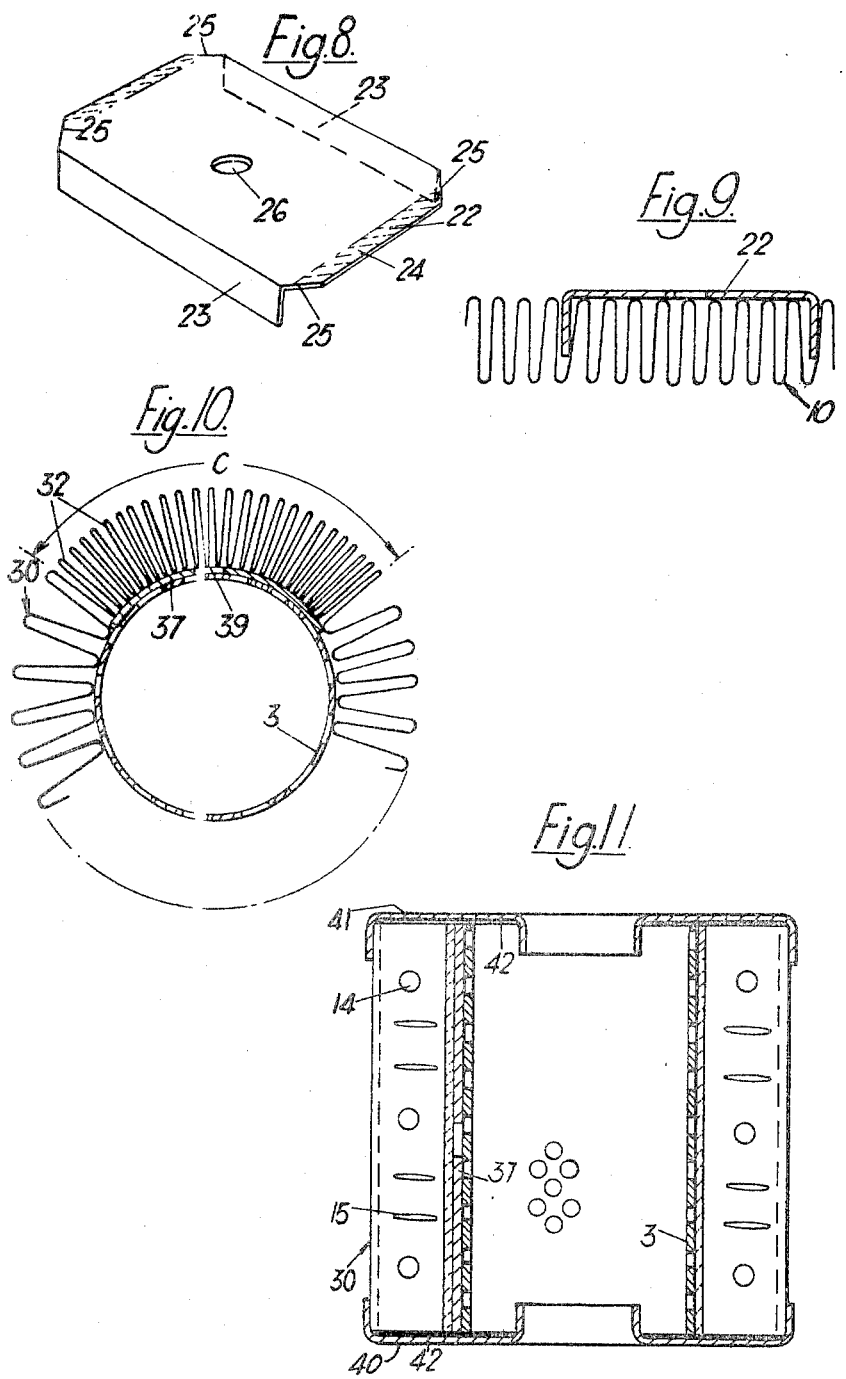

3,487,943
FILTERS FOR LIQUIDS
Kenneth Ernest Buckman, Southampton, England, assignor to General Motors Corporation, Detroit, Mich., a corporation of Delaware
Filed May 15, 1967, Ser. No. 638,446
Claims priority, application Great Britain, May 26, 1966, 23,646/66
Int. Cl. B01d 29/42, 29/06
U.S. Cl. 210—457                 1 Claim

ABSTRACT OF THE DISCLOSURE

In a filter element made of pleated filter paper one portion of the element is modified so that in operation of the filter the liquid flow velocity through the modified portion is less than that through the remainder of the element. The modified portion may be formed by compressing together a series of pleats, or by sealing to a group of pleats on one side of the element a sheet of similar or dissimilar filter material.

---

Related prior art is the U.S. patent to Ruschman, 3,368,687, and the U.S. patent to Ruschman et al., 3,406,832.

This invention relates to filters for liquids and in particular to filters for use in the oil lubrication systems of internal combustion engines.

Oil filters for internal combustion engines may be manufactured to give "full flow" filtration or "partial flow" filtration or a combination of both. In a "full flow" filter the filter element is of relatively coarsely porous construction and all the liquid delivered to the filter (until it becomes clogged) passes through the element: in a "partial flow" filter the element is of finer porosity and only a proportion of the liquid delivered to the element passes through the filter element, the remainder of the liquid by-passing the element. The "partial flow" element thus gives finer filtration but filters only a proportion of the total liquid delivered to it whereas the "full flow" element gives less fine filtration of all the liquid delivered to it.

In a filter which gives a combination of "full flow" and "partial flow" filtration two filter elements are arranged for operation in parallel, one element being a "full flow" element and the other element being a "partial flow" element. The disadvantage of such a combination element, assuming it is the same size as a "full flow" or "partial flow" element used in the same filter, is that in order that the combination shall have adequate life the "full flow" portion thereof has to be of such porosity as compared with the more finely porous "partial flow" element that its ability to retain particles of harmful size when the combined element is first put into operation is very low as compared with a filter in which the entire element is made of a single filter medium.

In a filter according to the present invention the filter element is made of pleated sheet filter material and the construction and arrangement of a portion of the element is modified so that in the operation of the filter the liquid flow velocity through said portion is less than that through the remainder of the element.

With such a filter the modified portion of the element, because of the reduced liquid flow velocity therethrough, filters at a higher efficiency, and takes out finer particles, than the other portion of the element. Thus, such an element has a life substantially equivalent to, but gives increased fineness of filtration compared with, an element which is made entirely of the same material but does not include a portion modified as stated above.

The modified portion of the element may be formed by compressing together some of the pleats of the filter element so that, because of the closer spacing of the pleats the resistance to flow through such portion of the element is increased so that there will be a relatively restricted flow through such portion of the element as compared with the flow through the pleats in the other portion of the element.

As an alternative to, or an addition to such a modification of a portion of the element a number of the pleats may have a portion of similar or dissimilar filter material sealed thereto over the inner or outer periphery of the element so as thereby to effect a further reduction in the rate of flow of liquid through such portion of the element as compared with the remainder thereof.

Such overlying or underlying portion of the filter material may be formed with a bleed hole therein to ensure an optimum flow velocity through the overlying or underlying pleats in the event that such portion of the filter material becomes clogged.

The additional portion of the filter material may be secured and sealed to the pleats through which it is desired to reduce the flow of liquid, by means of adhesive applied to for example a rectangular portion of the material around the edges thereof, the opposite ends of such piece of material being sealed, with the ends of the underlying or overlying pleats, to end caps which are sealed to opposite ends of the element.

The scope of the invention is defined by the appended claims; and the invention and the method by which it is to be performed are hereinafter particularly described with reference to the accompanying drawings, in which:

FIGURE 1 is a cross-section through a tubular pleated paper filter element according to the invention;

FIGURE 2 is a plan of a jig for use in the formation of the pleats of the element shown in FIGURE 1;

FIGURE 3 is a section on the line III—III of FIGURE 2;

FIGURE 4 is a section on the line IV—IV of FIGURE 2;

FIGURE 5 is a perspective view showing the construction of a pleated strip of sheet filter material for use in another embodiment of a filter element according to the invention;

FIGURE 6 is a cross-section of a filter element made from the pleated strip shown in FIGURE 5;

FIGURE 7 is a plan of a detail of a modification of the filter element according to FIGURE 6;

FIGURE 8 is a perspective view of a sheet of filter material used in the construction of a further modification of a filter element according to the invention;

FIGURE 9 is an end view of a portion of pleated filter paper with the sheet of FIGURE 8 arranged in conjunction therewith;

FIGURE 10 is a cross-section of another embodiment of a filter element according to the invention; and FIGURE 11 is a vertical section through the filter element shown in FIGURE 10.

FIGURE 1 shows a first embodiment of a tubular pleated filter element according to the invention, the filter element 1 being formed from a strip of sheet filter material, preferably synthetic resin impregnated filter paper, folded about regularly spaced transverse fold lines to form a series of accordion pleats 2, the ends of the strip being joined and the pleated strip being mounted on a perforate support tube 3 so that the pleats 2 extend substantially radially thereof. As shown in the drawing, a group of the pleats 2 are compressed together over the portion A of the element so that, because of the closer spacing of the pleats 2 the resistance to flow through the portion A of the element is increased. Liquid flow through the portion A is therefore relatively restricted as compared with the flow through the pleats in the other portion of the element.

As shown in FIGURES 2, 3 and 4, such an element can readily be formed by first folding a strip of filter paper to form a regular series of pleats 2, this then being placed on a slide jig 4 having external guide walls 5 and internal guide walls 6 which, when the pleated strip of filter paper is placed on the jig, engage between the pleats so as to form partitions between a central group A of pleats which are to be compressed together, and two adjacent groups of pleats to each side of the group A. The guide walls 5 and 6 converge in such a way towards one end that at this end the space between the two guide walls 6 is substantially reduced whereas that between the guide walls 5 and 6 to each side of the central portion of the jig 4 is the same as at the other end of the jig. Accordingly, by sliding the pleated strip from the wider to the narrower end of the jig 4 the central group A of pleats is compressed as compared with the two outer groups of pleats, as shown in FIGURES 3 and 4, which show the spacing of the pleats at the wide and the narrow end of the jig respectively. Because the center portion of the jig is narrower than the outer edges and because of the consistency of the paper used, the paper will be compressed at the center portion and will remain in the compressed configuration. The two ends of the pleated strip are then secured together, as by adhesive, and the element is then mounted on the perforate centre tube 3, as shown in FIGURE 1.

In a second embodiment of the invention shown in FIGURES 5 and 6 a filter element 10 is formed from a strip of filter paper which is similarly folded, as in the first embodiment, to form a series of accordion pleats 12 which may be, as shown, formed with spacer dimples 14, and spacer ribs 15 to space adjacent pleats from each other and to space from each other the two halves of each pleat. The ends of the pleats 12 may also be individually sealed by adhesive, as shown at 16.

In this embodiment of the filter element a group of the pleats 12 have a flat sheet 17 of similar or dissimilar filter material sealed thereto by adhesive at its edges, as shown at 18. The sheet 17 may also have a bleed hole 19 formed therein to enable liquid to flow direct from the pleats to the interior of the support tube 3 if sheet 17 is completely blocked. The pleated paper strip is then joined at its ends, as in the embodiment previously described and mounted on a perforate support tube 3. In this embodiment of the invention a number of the pleats, as indicated at B, overlie the additional sheet 17 of filter material so that liquid which passes through these pleats has also to flow in series through the sheet 17; accordingly the rate of flow of liquid through the portion B of the element will be reduced as compared with the flow through the remainder of the element.

As shown in FIGURE 7, the sheet 17 may be secured with adhesive to the underlying pleats in such a way as to leave small portions 20 thereof unsecured by adhesive so that the adhesive does not bridge across and seal off completely any one pleat. Minor leakage through such points will not significantly affect the performance of the element.

FIGURES 8 and 9 show an alternative method of placing the additional sheet of filter material so as to overlie a portion of the pleats of the element. In this case an additional sheet of filter material 22 is folded over at opposite edge portions 23 thereof and then placed over the pleats, the folded over portions 23 each engaging between adjacent pleats. The other edges of the sheet 22 may be secured as by adhesive 24 to the upper and lower ends of the pleats engaged by the sheet 22. Adhesive is not required along the folded-over portions 23 as these will be gripped between the pleats when the pleated strip is folded over to form a tubular element.

If the pleated paper strip has the ends of the pleats individually sealed by adhesive it is preferable to cut away the corners of the sheet 22 as shown at 25 in order to permit liquid to flow direct from the pleats to the perforate support tube 3 if the sheet 22 is clogged. In addition, as in the previous embodiments, a bleed hole 26 may be provided in the centre portion of the sheet 22.

FIGURES 10 and 11 show a further modified form of construction in which a filter element 30 is formed from a pleated strip of filter paper, a group C of the pleats 32 being compressed together over one portion of the periphery of the tubular element and a sheet of filter material 37 being placed in contact with the group C of compressed pleats between the latter and the perforate support tube 3, this construction being a combination of the features shown in FIGURES 1 and 6. The sheet 37 may be secured to the pleats in the manner previously described in relation to FIGURES 6 and 9 and may also be formed with a bleed hole 39.

As shown in FIGURE 11, the filter element 30 is preferably formed with spacer dimples and ribs impressed therein, as in the embodiment shown in FIGURE 5; and the ends of the pleated element are preferably secured to annular end caps 40, 41 as by adhesive 42. Alternatively or additionally, the ends of the pleats may be individually sealed with adhesive, as shown at 16 in FIGURE 5.

It will be understood that the elements shown in FIGURES 1 and 6 may be similarly provided with end caps.

In all of the embodiments of the invention described the construction is such that over one portion of the element the rate of flow of liquid therethrough is less than that over the other portion of the element. The effect of this is that the cumulative efficiency of the reduced flow portion of the element, that is, its efficiency in removing solids from liquid passing therethrough over a prolonged period, will be greater than that of the other portion of the element. In the construction shown in FIGURE 1 the reduced rate of flow over a portion of the element is obtained by compressing together a number of the pleats of the element; in the construction shown in FIGURE 6 the same result is obtained by placing a sheet of filter material between the pleats over one portion of the element and the perforate support on which the element is mounted; and in the construction shown in FIGURE 10 a combination of the two previous constructions is employed, a number of the pleats being compressed together and a sheet of filter material being interposed between these pleats and the perforate support.

With the constructions described the instantaneous efficiency of the element will be that of the paper of which the pleated portion of the element is formed, so that by appropriate selection of the porosity of the filter paper a desired minimum efficiency of the element throughout its life can be obtained, together with an increased efficiency of filtration through one portion of the element, the element thus providing the benefits of both full flow and partial flow filtration.

I claim:
1. In a filter element comprising a cartridge having end caps, a central perforated tube joining said end caps, openings in said end caps communicating with said tube, a first sheet of filtering material formed into a series of pleats extending completely around said tube, a portion of said pleats being compressed to be closer together than the other pleats and to increase the resistance to flow therethrough, a second sheet of filter material adjacent said tube and being coextensive with the compressed pleats to effect a further reduction in the rate of flow through the compressed pleated portion and second sheet of filter material, said second sheet of filter material having an orifice therein to insure an optimum flow velocity through said second sheet of filter material in the event said sheet becomes clogged.

References Cited

UNITED STATES PATENTS

| | | | |
|---|---|---|---|
| 3,125,515 | 3/1964 | Gruner et al. | 210—493 |
| 3,127,341 | 3/1964 | Abeles | 210—493 |
| 3,198,336 | 8/1965 | Hyslop | 210—457 |
| 3,279,614 | 10/1966 | Briggs | 210—457 |
| 3,283,904 | 11/1966 | Buckman et al. | 210—457 X |
| 3,368,687 | 2/1968 | Ruschman | 210—457 |
| 3,406,832 | 10/1968 | Ruschman et al. | 210—457 |

FOREIGN PATENTS 1,233,037  5/1960  France.

REUBEN FRIEDMAN, Primary Examiner

C. M. DITLOW, Assistant Examiner

U.S. Cl. X.R.

210—493